Patented Oct. 10, 1967

3,346,610
ACYLOXY-CONTAINING SILOXANES AND
PROCESS THEREFOR
George M. Omietanski, Tonawanda, and Wallace G. Reid, Grand Island, N.Y., assignors to Union Carbide Corporation, a corporation of New York
No Drawing. Filed Aug. 7, 1963, Ser. No. 300,673
25 Claims. (Cl. 260—448.8)

ABSTRACT OF THE DISCLOSURE

Process for preparing acyloxy-endblocked organosiloxanes which comprises reacting an acyloxysilane or acyloxysiloxane in the presence of a metal halide Friedel-Crafts catalyst with a cyclic diorganosiloxane.

This invention relates to a process for preparing acyloxy-containing organosiloxanes of specific desired composition. More particularly, it relates to a process of reacting a cyclic diorganosiloxane with an acyloxysilane or an acyloxysiloxane in the presence of a metal halide Friedel-Crafts catalyst. It also relates to specific novel acyloxy-containing siloxanes.

Acyloxy-containing organosiloxanes, and especially acyloxy-endblocked organosiloxanes, are known to be useful as starting materials in known processes. By way of illustration, the acyloxy groups in a diorganosiloxane can be hydrolyzed, the hydrolyzate so produced can be dehydrated and the dehydrated hydrolyzate can be polymerized to produce a fluid diorganopolysiloxane. These fluid polysiloxanes are useful as starting materials producing viscous oils and gums that can be cured to form silicone elastomers.

Acyloxy-endblocked organosiloxanes can be prepared, for example, by reaction between an alkylsiloxane and an organic acid and/or anhydride thereof in the presence of sulfuric acid catalyst. Such prior art method is described in U.S. 2,910,496. This method, while producing acyloxy-endblocked organosiloxanes, has the disadvantage that the reaction product consists of a mixture of acyloxy-containing siloxanes and other organosilicon compounds of a wide variety. It is difficult to produce and separate high yields of specific desired products.

We have found that acyloxy-endblocked organosiloxanes of known specific desired composition can be prepared in high yield by the reaction between a cyclic diorganosiloxane and an acyloxy-silane or an acyloxysiloxane in the presence of a metal halide Friedel-Crafts catalyst. A polar organic solvent is also preferably employed.

The acyloxy-endblocked organosiloxanes produced by this process have the general formula:

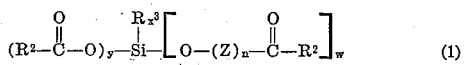
(1)

wherein $R^3$ are monovalent organic radicals which are not readily acylated and which are selected from the class consisting of alkyl radicals, cyano-alkyl radicals, alkenyl radicals, alkoxy alkyl radicals and nitroaryl radicals; $R^2$ is selected from the class consisting of hydrogen, alkyl radicals, aryl radicals, alkaryl radicals and aralkyl radicals; $x$ is an integer having a value of 0 to 3 inclusive; $y$ is an integer having a value of 0 to 3 inclusive; $w$ is an integer having a value of 1 to 3 inclusive; the sum of $x+y+w$ is 4; $n$ is an integer having a value greater than 0; Z is a divalent radical selected from the class consisting of $(RR^1SiO)$ units and

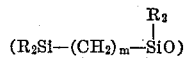

units wherein R and $R^1$ are monovalent organic radicals which are not readily acylated as defined above for $R^3$ and $m$ is an integer having a value from 2 to 3 inclusive.

The monovalent organic radicals which are not readily acylated under the reaction process conditions which constitute R, $R^1$ and $R^3$ in the above formula are illustrated by alkyl radicals, such as methyl, ethyl, propyl, isopropyl, butyl, isobutyl, amyl, hexyl and the like; cyano-substituted alkyl radicals, such as gamma-cyanopropyl, delta-cyanobutyl, beta-cyanobutyl and the like; alkenyl radicals, such as vinyl, cyclohexenyl, allyl and the like; alkoxy alkyl radicals, such as gamma-methoxypropyl and the like and nitroaryl radicals, such as meta-nitrophenyl and the like.

The monovalent hydrocarbon radicals which constitute $R^2$ is the above formula are illustrated by alkyl groups, such as methyl, ethyl, propyl, isopropyl, butyl, isobutyl, amyl, hexyl and the like; aryl groups, such as phenyl, naphthyl and the like; alkaryl groups, such as tolyl, ethylphenyl, xylyl, mesityl and the like; and aralkyl groups, such as benzyl, phenylethyl and the like.

In one modification of the present invention, a cyclic diorganosiloxane is reacted with an acyloxysilane in the presence of a metal halide Friedel-Crafts catalyst. In this reaction the acyloxy-endblocked organosiloxane product has the general formula:

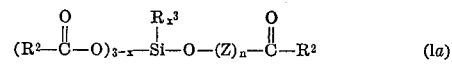
(1a)

wherein $R^2$, $R^3$, $x$ and $n$ are defined above.

The acyloxysilanes useful as one of the starting materials in the process of the present invention in general have the following formula:

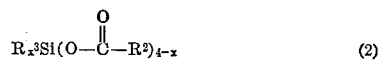
(2)

wherein $R^2$, $R^3$ and $x$ are as defined above. Such acyloxysilanes can be prepared by well known procedures, such as reaction of a chlorosilane with an acyl anhydride such as acetic anhydride, or anhydrous sodium acylate, such as sodium acetate. Cleavage of a disiloxane with an anhydride can also be used as a preparation process. Specific examples of acyloxysilanes useful in the present invention are: trimethylacetoxysilane, vinyldimethylacetoxysilane, trimethylpropionoxysilane, dimethyldiacetoxysilane, methyltriacetoxysilane and silicon tetraacetate (tetraacetoxysilane). Acyloxysilanes prepared from dibasic acids, such as malonic acid and succinic acid, can also be used.

Cyclic diorganosiloxanes useful in the process of the present invention contain strained cyclic siloxane rings. The preferred cyclic diorganosiloxanes have the general formula:

$$(RR'SiO)_p \qquad (3)$$

wherein R and $R^1$ are as defined above and $p$ is an integer having a value from 3 to 4 inclusive. It is preferred that $p$ be 3. Specific examples of cyclic diorganosiloxanes of Formula 3 above are: cyclic dimethylsiloxane trimer, cyclic diethylsiloxane trimer, cyclic dimethylsiloxane tetramer, cyclic methylethylsiloxane trimer, cyclic methylvinylsiloxane trimer and the like. These cyclic diorganosiloxanes are prepared by well known techniques, such as hydrolysis and condensation of dichlorodiorganosilanes. Mixed cyclic diorganosiloxanes, such as cyclic methylvinylsiloxane-dimethylsiloxane trimer, can also be employed in the process of this invention.

Other strained cyclic siloxane compounds useful in the process of the present invention are those having the general formula:

(4)

wherein R and *m* are defined above. Specific examples of cyclic diorganosiloxanes of Formula 4 are compounds having the formulas:

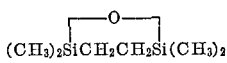

and

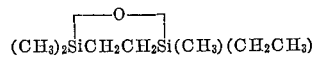

These cyclic diorganosiloxanes are also prepared by well known techniques, such as hydrolysis and condensation of appropriate chloroorganosilanes.

The overall reaction carried out by the process of the present invention can be further described by reference to the following equation which illustrates the reaction between an acyloxysilane and a cyclic diorganosiloxane:

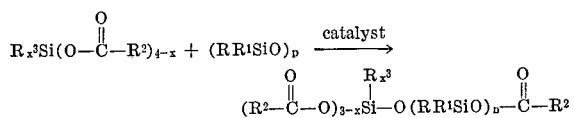

R, $R^1$, $R^2$, $R^3$, $x$, $p$ and $n$ are all defined above.

The reaction product will be predominantly a compound wherein $n$ is the same number as $p$ but there will also be present a small amount of compounds wherein $n$ is both a smaller and a larger number than $p$.

Useful catalysts in the process of the invention are the Friedel-Crafts metal halides. Such compounds are, for example, zinc dichloride, bismuth trichloride, mercury dichloride, vanadium oxytrichloride, zinc dibromide, zirconium tetrachloride, titanium trichloride, antimony trichloride and the like. Zinc dichloride is the preferred catalyst. The specific catalyst employed will depend upon the particular combination of reaction temperature and time which is used. The more reactive metal halide catalysts, such as iron trichloride, require relatively short reaction time and lower reaction temperature. Otherwise, the catalyst will promote equilibration resulting in a gross mixture of siloxanes of varying composition. Catalysts having lesser degree of activity, such as zinc dichloride and mercury dichloride, provide desirable yields of specific composition product at convenient reaction times and temperatures. The metal halide catalyst can be used in amounts from about 0.1 to about 10 weight percent based on total weight of reactants. When metal halide catalysts of reduced activity, such as the preferred zinc dichloride, are employed, it is desirable that some halide-containing compound, such as an acyl halide or an alkyl-halosilane, be present. Such halide-containing compound can be employed in the range of from about 0.01 to about 5 weight percent based on total weight of reactants. The halide-containing compound is preferably present in an amount from about 0.1 to about 2 weight percent based on total weight of reactants. It is desirable that the acyl group of the acyl halide be the same acyl group that is present in the acyloxysilane or acyloxysiloxane starting material. It is also desirable that the halide of the acyl halide or the alkylhalosilane be the same halogen as that of the metal halide Friedel-Crafts catalyst. Acetyl chloride is an example of a useful acyl halide and trimethylchlorosilane is an example of a useful alkylhalosilane. It is desirable that the alkylhalosilane have the same silicon functionality as the acyloxysilane.

The reaction conditions for carrying out the process of this invention are not narrowly critical. Reaction times of as low as 15 minutes and as much as 46 hours or more have been successfully employed. The reaction time depends on a number of process variables. The nature of the reactants, type of catalyst, pressure, temperature, and the presence or absence of a solvent all have a bearing on the reaction time.

The reaction of an acyloxysilane with a cyclic diorgano- siloxane can be carried out at temperatures from below about 25° C. to about 250° C. and above. The preferred temperature range for the reaction is from about 50° C. to about 160° C.

The process can be run with advantage at pressures higher than atmospheric. High pressures are particularly helpful when low boiling acyloxysilanes or low boiling solvents are used. However, in many cases the process can be carried out at atmospheric pressure.

It is convenient to carry out the reaction within a liquid organic compound in which the starting materials are soluble. Preferably, the liquid organic compounds are polar in nature since they generally allow the reactions to be carried out at lower temperatures under homogeneous conditions. Examples of useful polar solvents are ethers such as $C_4H_9OC_4H_9$ and $C_4H_9OCH_2CH_2OC_4H_9$, ketones such as $C_2H_5COC_4H_9$ and $CH_3COCH_3$, nitriles such as $CH_3CN$, alcohols such as $C_2H_5OH$, and acids such as $CH_3COOH$. Polar solvents containing active hydrogen, such as alcohols, glycols and acids, are the least preferred solvents since they can react with the acyloxysilane and acyloxysiloxane starting materials as well as the acyloxy-endblocked siloxane products to form undesirable by-products.

The nature of the acyloxy-endblocked siloxane products resulting from the process of the invention can be affected by the acyloxysilane/cyclic diorganosiloxane molar ratio in the reaction mixture. When this ratio is 1 or greater than 1, products containing short siloxane chains will be favored. When this ratio is less than 1, products containing longer siloxane chains will be favored.

Acyloxy-endblocked diorganosiloxane products containing positional isomers can be formed when mixed cyclic diorganosiloxanes are used as reactants. For example, in the reaction of $(CH_3)_3SiOOCCH_3$ with $[(CH_3)(CH_2\!\!=\!\!CH)SiO]$ $[(CH_3)_2SiO]_2$ the following compounds are possible:

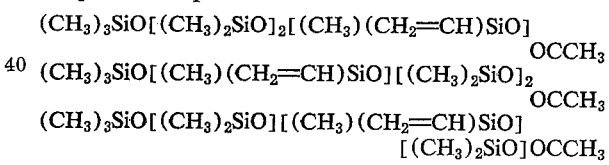

This situation can become more complex when other acyloxy-silanes are used and where higher molecular weight products are formed.

The acyloxy-enblocked diorganosiloxane products having specific desired composition which are produced by the process of this invention generally are known products having known utility in the preparation of hydroxy-endblocked siloxane fluids of desired structure, surfactants and anti-oxidants. In particular, acetoxy-endblocked dimethylsiloxane so produced has been used in the preparation of all-methylsiloxane low temperature elastomers. Such elastomers have very low Gehman freezing points but retain good solvent resistance.

The process of the present invention will be further described by reference to the following examples.

*Example 1*

Trimethylacetoxysilane (14.78 g., 0.112 mole) and hexamethylcyclotrisiloxane (24.86 g., 0.112 mole) were placed in a 200 ml. distilling flask. Zinc dichloride (0.415 g., 1.05 weight percent) was added and the heterogeneous mixture was heated at 100° C. for 6 hours. Distillation without removal of the catalyst gave a 72 mole percent yield of 1-acetoxynonamethyltetrasiloxane,

This product had the properties of B.P. 106–108° C./10 mm. mercury; index of refraction of $n_D^{25}=1.3947$; density of $d_{25°}^{25°}=0.928$ g./ml. Infrared spectroscopy analysis was consistent for the above product structure.

Additional analytical results on the pure distilled product are as follow:

Found: 37.2% C; 8.0% H; 31.1% Si; 16.6% OCCH$_3$; molar refraction of MR$_D$ 91.50. Calculated for:

$$C_{11}H_{30}O_5Si_4:$$

37.3% C; 8.5% H; 31.6% Si; 16.6% OOCH$_3$, MR$_D$ 91.47.

Example 2

Into a 5-liter, 3-necked flask equipped with a stirrer, thermometer and reflux condenser, were placed trimethylacetoxysilane (557 g., 4.22 moles), dimethylsiloxane cyclic trimer (1,875 g., 8.43 moles), and zinc dichloride (24.3 g., 1 weight percent). The reactants were heated in a constant temperature oil bath at 115° C. for 46.5 hours with vigorous stirring. The reaction mixture was then cooled, filtered, flash distilled, and fractionated. The distilled product contained 41 mole percent $$(CH_3)_3SiO[(CH_3)_2SiO]_3OCCH_3$$

23 mole percent $(CH_3)_3SiO[(CH_3)_2SiO]_6OCCH_3$, 8 mole percent $(CH_3)_3SiO[(CH_3)_2SiO]_9OCCH_3$ and 4 mole percent $(CH_3)_3SiO[(CH_3)_2SiO]_{12}OCCH_3$. Infrared spectroscopy analyses supported the above product structures. No cleavage products were isolated, but 23 weight percent of the dimethylsiloxane cyclic trimer reactant was recovered unchanged. The conversion of trimethylacetoxysilane to products was 100% and the conversion of dimethylsiloxane cyclic trimer to products was 70 mole percent. Additional analytical data on the distilled product fractions are as follows:

$(CH_3)_3SiO[(CH_3)_2SiO]_6OCCH_3$: B.P. 95–100° C./ 0.15 mm. mercury; $n_D^{25}=1.3990$; $d_{25°}^{25°}=0.9456$ g./ml. Found: 34.8% C; 8.3% H; 33.8% Si; 10.5% OOCCH$_3$; MR$_D$ 147.57. Calculated for: $C_{17}H_{48}O_8Si_7$: 35.4% C; 8.4% H; 34.0% Si; 10.2% OOCCH$_3$; MR$_D$ 147.51.

$(CH_3)_3SiO[(CH_3)_2SiO]_9OCCH_3$ B.P. 137–140° C./ 0.18 mm. mercury; $n_D^{25}=1.4004$; $d_{25°}^{25°}=0.9615$ g./ml. Found: 33.5% C; 8.3% H; 36.9% Si; 8.4% OOCCH$_3$; MR$_D$ 201.6. Calculated for: $C_{23}H_{66}O_{11}Si_{10}$: 34.6% C; 8.3% H; 35.1% Si; 7.4% OOCCH$_3$; MR$_D$ 203.4.

$(CH_3)_3SiO[(CH_3)_2SiO]_{12}OCCH_3$: B.P. 150–200° C./ 0.10 mm. mercury; $n_D^{25}=1.4015$; $d_{25°}^{25°}=0.9578$ g./ml. Found: 34.3% C; 8.5% H; 34.8% Si; 5.1% OOCCH$_3$; MR$_D$ 259.4. Calculated for: $C_{29}H_{34}O_{14}Si_{13}$: 34.1% C; 8.3% H; 35.7% Si; 5.8% OOCCH$_3$; MR$_D$ 261.1.

Example 2 shows that when the molar ratio of acyloxysilane/cyclic diorganosiloxane is less than 1 there are formed products containing long siloxane chains.

Example 3

In a 5-liter, 3-necked flask equipped with stirrer, reflux condenser, and thermometer were placed trimethacetoxysilane (924 g., 7.0 moles), dimethylsiloxane cyclic trimer (1554 g., 7.0 moles), zinc dichloride (25 g., 1 weight percent) and acetyl chloride (12.5 g., 0.5 weight percent). When the mixture was heated, the pot temperature reached 150° C. within 40 minutes. The zinc dichloride catalyst was then deactivated by addition of excess anhydrous sodium acetate. Filtration resulted in 2465 g. of crude product which contained about 50 mole percent $(CH_3)_3SiO[(CH_3)_2SiO]_3OCCH_3$.

This Example 3 indicates that the presence of additional chloride increases the activity of the zinc dichloride catalyst.

A series of experiments were carried out using equimolar amounts of trimethylacetoxysilane and dimethylsiloxane cyclic trimer with 1 weight percent ZnCl$_2$ catalyst. Chloride was removed from the trimethylacetoxysilane by prolonged refluxing over anhydrous sodium acetate. In addition to using a control (no chloride added), several reactions were carried out containing known amounts of added chloride. The reactions were run, side by side, in a 150° C. thermostated bath. The reaction flasks were equiped with Friedrichs condensers and drying tubes. Relative reaction rates were evaluated by noting the time required for the reaction flask contents to reach 140° C. The effect of added chloride as acetyl chloride or trimethylchlorosilane on the relative reaction rate is shown in the table below. By way of comparison, the control containing no added chloride required 3.2 hours to reach 140° C., while the reaction mixture containing 1 weight percent added chloride as acetyl chloride reached 140° C. in 28 minutes.

TABLE I
[Effect of added chloride on relative reaction rate]

| Weight percent added chloride | 0 | 0.5 | 1.0 |
|---|---|---|---|
| Chloride added as acetyl chloride (relative reaction rate) | 1 | 4.4 | 6.8 |
| Chloride added as trimethylchlorosilane (relative reaction rate) | 1 | 1.8 | 3.2 |

Example 4

The zinc chloride catalyzed reaction of trimethylacetoxysilane with dimethylsiloxane cyclic trimer was carried out in a variety of solvents. In general, equimolar amounts of the reactants plus 1 weight percent ZnCl$_2$ were dissolved in a solvent and heated at reflux for varying periods of time. The reaction mixture was then stripped of solvent, filtered and fractionated. The experimental data are summarized in Table II.

TABLE II
[Reaction between trimethylacetoxysilane and dimethylsiloxane cyclic trimer in the presence of solvents]

| Solvent | Wt. Percent Solvent | Reaction Time, hours | Final Pot Temperature, °C. | Comment |
|---|---|---|---|---|
| C$_4$H$_9$O(CH$_2$)$_2$OC$_4$H$_9$ | 29 | 3.25 | 150 | 37.5 mole percent MD$_3$OAc [1] isolated. |
| C$_2$H$_5$COC$_4$H$_9$ | 37 | 3.0 | 150 | 60.0 mole percent MD$_3$OAc isolated. |
| CH$_3$CN | 38 | 5.0 | 90 | 48.0 mole percent MD$_3$OAc isolated. |
| CH$_3$COOH | 42 | 4.0 | 120 | 10.0 mole percent MD$_3$OAc isolated. |
| CH$_3$COCH$_3$ | 38 | 9.0 | 70 | 42.0 mole percent MD$_3$OAc isolated. |
| Control | 0 | 1.5 | 152 | 45 mole percent MD$_3$OAc and 20% MD$_6$OAc [2] isolated. |

[1] MD$_3$OAc=(CH$_3$)$_3$SiO[(CH$_3$)$_2$SiO]$_3$OCCH$_3$
[2] MD$_6$OAc=(CH$_3$)$_3$SiO[(CH$_3$)$_2$SiO]$_6$OCCH$_3$

Example 5

Trimethylacetoxysilane (23.1 g., 0.175 mole), dimethylsiloxane cyclic tetramer (51.8 g., 0.175 mole), and ZnCl$_2$ (0.749 g., 1 weight percent) were heated 46 hours at 120° C. without stirring. The reaction mixture was then cooled, filtered and fractionation of the filtrate gave a 9.4 mole percent yield of $$(CH_3)_3SiO[(CH_3)_2SiO]_4OCCH_3$$

This product had the properties of B.P. 60–65° C./0.20 mm. mercury and $n_D^{25}=1.3967$. The recovery of trimethylacetoxysilane was 77 mole percent, and the recovery of the cyclic tetramer starting material was 84 mole percent. Additional analyses gave the results of:

Found: 36.3% C; 8.3% H; 32.5% Si; 14.1% OOCCH$_3$.
Calculated for: $C_{13}H_{36}O_6Si_5$: 36.3% C; 8.4% H; 32.6% Si; 13.8% OOCCH$_3$.

Example 6

Equimolar amounts of $(CH_3)_3SiOOCCH_2CH_3$ (0.5 mole) and $[(CH_3)_2SiO]_3$ (0.5 mole) and 1 weight percent $ZnCl_2$ were heated together without stirring. The reaction was terminated when the pot temperature reached 160° C. (2.3 hours). Fractionation of the reaction mixture gave 53 mole percent of $$(CH_3)_3SiO[(CH_3)_2SiO]_3OCCH_2CH_3$$

having the properties of B.P. 110–111° C./10 mm. mercury, $n_D^{25}=1.3970$, $d_{25°}^{25°}$ 0.9205. Found: 39.1% C; 8.9% H; 30.1% Si; 19.7% $OOCCH_2CH_3$; $MR_D$ 96.8; mol. wt. 384.2. Calculated for: $C_{12}H_{33}O_5Si_4$: 39.0% C; 9.0% H; 30.4% Si; 19.8% $OOCCH_2CH_3$; $MR_D$ 96.22; mol. wt. 369.7.

The distilled product also contained 10 mole percent $(CH_3)_3SiO[(CH_3)_2SiO]_6OCCH_2CH_3$ having the properties of B.P. 149–150° C./5 mm. mercury; $n_D^{25}=1.4015$; $d_{25°}^{25°}$ 0.956. Found: 37.1% C; 8.7% H; 31.3% Si; $MR_D$ 152.1; mol. wt. 540.0. Calculated for: $C_{18}H_{51}O_8Si_7$: 36.5% C; 8.7% H; 33.2% Si; $MR_D$ 150.7; mol. wt. 592.2.

Example 7

Using 1 weight percent $ZnCl_2$ as catalyst, $$(CH_3)_3SiOOCCH_3$$

(30.2 g., 0.229 mole) and $[(C_2H_5)_2SiO]_3$ (70.0 g., 0.229 mole) were heated at 130–140° C. for 11 hours. Fractionation of the reaction product gave 6.9 mole percent of $(CH_3)_3SiO[(C_2H_5)_2SiO]_3OCCH_3$ having the properties of B.P. 103–105° C./0.5 mm. mercury, $n_D^{25}=1.4230$. Found: 46.4% C; 9.5% H; 25.6% Si. Calculated for: $C_{17}H_{42}O_5Si_4$: 46.5% C; 9.65% H; 25.6% Si.

Example 8

Vinyldimethylacetoxysilane was prepared by heating $[(CH_2=CH)(CH_3)_2Si]_2O$ (0.893 mole), $(CH_3CO)_2O$ (10 mole percent excess), and $ZnCl_2$ (24.3 g., 13 weight percent) for 2 hours at 100° C. Filtration of the product followed by fractionation gave 89 mole percent vinyldimethylacetoxysilane having the properties of B.P. 125–126° C., $n_D^{25}=1.4086$. Found: 48.3% C; 8.3% H; 19.1% Si; 41.2% $OOCCH_3$. Calculated for: $C_6H_{12}O_2Si$: 49.9% C; 8.4% H; 19.5% Si; 40.9% $OOCCH_3$.

Equimolar amounts (0.215 mole) of the above prepared vinyldimethylacetoxysilane and dimethylsiloxane cyclic trimer were heated for 5 hours at 110° C. followed by 3 hours at 140° C. using 1 weight percent of $ZnCl_2$ as a catalyst. Filtration of the product followed by fractionation of the filtrate gave 70 mole percent of $(CH_2=CH)(CH_3)_2SiO[(CH_3)_2SiO]_3OCCH_3$ having the properties of B.P. 94–95° C./2.2 mm.; $n_D^{25}=1.4038$; $d_{25}^{25°}$ 0.9394. The infrared spectroscopy results were consistent with the above structure. Found: 39.5% C; 8.2% H; 30.4% Si; 15.9% $OOCCH_3$; $MR_D$ 95.50. Calculated for: $C_{12}H_{30}O_5Si_4$: 39.3% C; 8.3% H; 30.6% Si; 16.1% $OOCCH_3$; $MR_D$ 95.75.

The overall conversion of vinyldimethylacetoxysilane to products was 60 mole percent.

Example 9

Dimethyldiacetoxysilane (58.7 g., 0.33 mole), dimethylsiloxane cyclic trimer (74.1 g., 0.33 mole) and zinc dichloride (1.3 g., 1 weight percent) were heated together for 6 hours at 100° C. followed by 4 hours at 140° C. The reaction mixture was rapidly distilled from the zinc chloride catalyst and then fractioned. The distilled products contained 50.4 mole percent yield of $$CH_3COO[(CH_3)_2SiO]_4OCCH_3$$

and 6 mole percent yield of $$(CH_3COO)[(CH_3)_2SiO]_7OCCH_3$$

The former product had the properties of B.P. 70–72° C./0.3 mm. mercury, $n_D^{25}=1.4008$. It also contained 25.5% $OOCCH_3$ (29.6% theoretical for $C_{12}H_{30}O_7Si_4$). The latter product had the properties of B.P. 120–130° C./0.3 mm. mercury, $n_D^{25}=1.4018$. It also contained 19.0% $OOCCH_3$ (19.0% theoretical for $C_{18}H_{48}O_{18}Si_7$).

Also isolated were small amounts of cleavage products such as $CH_3COO[(CH_3)_2SiO]_2OCCH_3$ and $$CH_3COO[(CH_3)_2SiO]_3OCCH_3$$

Example 10

In a 200 ml. distilling flask equipped with a thermometer well were placed methyltriacetoxysilane (55 g., 0.25 mole), dimethylsiloxane cyclic trimer (55.6 g., 0.25 mole) and zinc dichloride (1.1 g., 1 weight percent). The mixture was heated at 100° C. for 5 hours followed by 1 hour at 140° C. The reaction mixture was rapidly distilled from the zinc chloride catalyst and then fractionated. There was obtained a 63 percent yield of $$(CH_3COO)_2Si(CH_3)O[(CH_3)_2SiO]_3OCCH_3$$

having the properties of B.P. 94–97° C./0.2 mm. mercury $n_D^{25}=1.4050$, $d_{25°}^{25°}$ 1.0582. Found: 35.1% C; 7.0% H; 24.8% Si; 39.7% $OOCCH_3$; $MR_D$ 102.5; mol. wt. 458. Calculated for: $C_{13}H_{30}O_9Si_4$: 35.3% C; 6.8% H; 25.4% Si; 40.0% $OOCCH_3$; $MR_D$ 102.0; mol. wt. 443.

The following Examples 11 to 13 describe the reaction between acyloxysilanes and cyclic diorganosiloxanes without the use of preferred catalysts or under prior art equilibration conditions.

Example 11

Heating uncatalyzed mixtures of trimethylacetoxysilane and dimethylsiloxane cyclic trimer at elevated temperatures in a stainless steel pressure vessel resulted in the formation of long chain linear siloxane products. The reaction rate was reasonable at 250° C. but slow at 200° C. Definite chemical species were not isolated from the reaction products because of their high boiling points. Since the linear products had low acetoxy contents even in the presence of unreacted dimethylsiloxane cyclic trimer, it would appear that the reaction of the desired $$(CH_3)_3SiO[(CH_3)_2SiO]_3OCCH_3$$

product with $[(CH_3)_2SiO]_3$ is much faster than the reaction of $(CH_3)_3SiOOCCH_3$ with $[(CH_3)_2SiO]_3$. This assumption is in accord with the recovery of large amounts of unreacted $(CH_3)_3SiOOCCH_3$. The acetoxy content of the product residues indicated the materials to have the general formula $(CH_3)_3SiO[(CH_3)_2SiO]_{18-21}OCCH_3$. The experimental data is summarized below:

| Mole Ratio of Cyclic Siloxane Acyloxysilane | Temp., ° C. | Reaction Time, hours | Mole Percent Yield [1] | Viscosity, Cstks. (25° C.) | Weight percent $OOCCH_3$ |
|---|---|---|---|---|---|
| 1.2 | 250 | 1.8 | 70 | 36 | 2.6 |
| 1.2 | 250 | 2.5 | 27 | 32 | 3.3 |
| 0.5 | 250 | 1.5 | 100 | (2) | (2) |

[1] Based on $[(CH_3)_2SiO]_3$.
[2] Equilibration had taken place probably due to the presence of a contaminant in the pressure vessel.

Example 12

Employing sulfuric acid as a catalyst, dimethyldiacetoxysilane (0.5 mole) was reacted with dimethylsiloxane cyclic tetramer (0.25 mole) at room temperature. Equilibration occurred producing products containing $$(CH_3CO)_2O, [(CH_3)_2SiO]_n,$$

and low molecular weight acetoxy-endblocked fluids having formula of $CH_3COO[(CH_3)_2SiO]_nOCCH_3$.

Example 13

A mixture of methyltriacetoxysilane (0.5 mole) and dimethylsiloxane cyclic tetramer (0.25 mole) was catalyzed with sulfuric acid. The mixture was allowed to stand with occasional shaking at room temperature for about 8–13 days during which time equilibration took place. Distillation gave a mixture of acetoxy-endblocked siloxane fluids from which no definite chemical species was isolated.

In another modification of the present invention, the acyloxy-endblocked organosiloxanes produced by the process of the present invention having the Formula 1a can be further reacted with cyclic diorganosiloxanes in the presence of a metal halide Friedel-Crafts catalyst to form additional acyloxy-endblocked organosiloxanes of controlled structure. Such reactions are illustrated by the following equations:

(a)
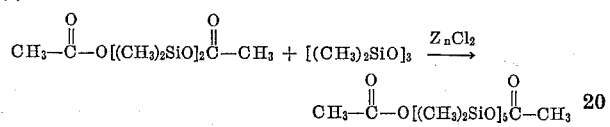

(b)
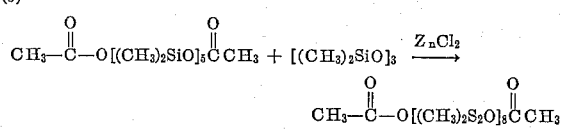

(c)
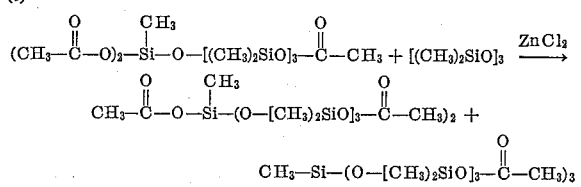

(d)
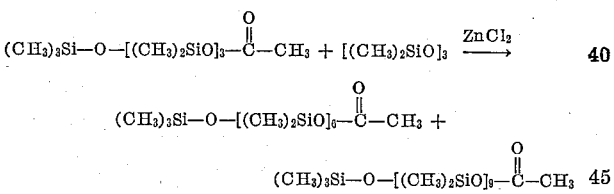

Reaction (c) above is further illustrated in the following example which describes preparation of two novel acyloxy-containing siloxanes. These novel siloxanes have the generic formula of

     (5)

wherein R, R², R³ are defined above, s is an integer having a value of 0 to 1 inclusive, t is an integer having a value of 2 to 3 inclusive, and the sum of s and t is 3. The two novel siloxanes have the species formulae of

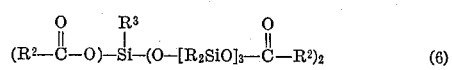     (6)
and
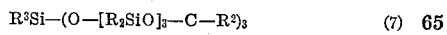     (7)

where R, R² and R³ are defined above. Further novel species are:

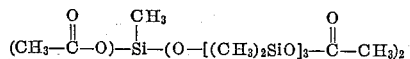
and
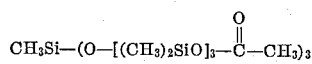

*Example 14*

Hexamethylcyclotrisiloxane (30.5 g., 0.135 mole), 1,1,7 - triacetoxyheptamethyltetrasiloxane (60.0 g., 0.135 mole) and zinc chloride (0.9 g., 1 weight percent) were heated together in a 250 ml. flask equipped with a thermometer well and reflux condenser for 5 hours at 140° C. Flash distillation followed by fractional distillation gave 37 mole percent of recovered

and 27.5 mole percent conversion to

having properties of B.P. 137–144° C./0.2 mm. of mercury, refractive index of $n_D{}^{25}=1.4047$, and $MR_D$ of 159.0. This fraction was analyzed to contain 24.6 weight percent $CH_3COO$. Theoretical values for

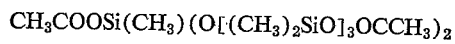

are 26.6 weight percent $CH_3COO$ and $MR_D$ of 158.3. All of the hexamethylcyclotrisiloxane reacted. The nonvolatile residue in the flask contained 40 mole percent conversion to $CH_3Si(O[(CH_3)_2SiO]_3OCCH_3)_3$ which was analyzed to contain 14.0 weight percent $CH_3COO$. Theoretical value for $CH_3Si(O[(CH_3)_2SiO]_3OCCH_3)_3$ is 13.3 weight percent $CH_3COO$.

The products of the above reaction are useful in the preparation of foam stabilizers. This is shown by the following example.

*Example 15*

A 31.3 g. mixture containing

and $CH_3Si(O[(CH_3)_2SiO]_3OCCH_3)_3$ prepared in a manner similar to that described in Examples 10 and 14 was heated with 110 g. of a butanol started 50/50 weight percent propylene oxide-ethylene oxide copolymer of about 1500 molecular weight and containing about 1 weight percent OH. This heating took place at 147° C. for 3 hours in the presence of 100 ml. of xylene. The volatiles were then stripped by heating to 160° C. resulting in a nearly quantitative yield of a siloxanepolyoxyalkylene block copolymer which was slightly turbid and had a viscosity of 500 centipoises at 25° C. This was designated Copolymer A. The above reaction was repeated using similar quantities of starting materials by heating at 140° C.–145° C. for 5 hours in the presence of 2.8 g. of anhydrous sodium acetate catalyst. The xylene was omitted. Filtration resulted in a clear block copolymer with a viscosity of 550 centipoises at 25° C. This was designated Copolymer B.

The above block copolymers were evaluated as urethane foam stabilizers. The following formulations were used in the evaluations:

FORMULATION I

| Item: | Parts by weight |
|---|---|
| A mixture of 50 weight percent polypropylene glycol (molecular weight of 2025) and 50 weight percent propylene oxide adduct of glycerol (hydroxyl number of 56) | 450 |
| Water | 4 |
| Triethylamine | 0.3 |
| Block Copolymer A or B | 3.75 |
| Dibutyl tin dilaurate | 3 |

FORMULATION II

| | |
|---|---|
| Toluene diisocyanate | 165.5 |

Urethane foams were prepared by mixing Formulations I and II and well stirring the resulting mixture. The foams were then evaluated and the results shown in the following table.

TABLE
[Effect of siloxane-hydrocarbon oxide block copolymers on urethane foam properties]

| Copolymer | Foam Properties | | | |
|---|---|---|---|---|
| | Rise (in.) | Cells per in. | Cell Uniformity | Remarks |
| A | 5½ | 5–10 | Fair | Closed cells throughout. |
| B | 6⅜ | 30 | Very Good | Good foam, closed cells at top ridge. |
| None | | | Foam collapsed | |

The above information shows that silicone block copolymers can be readily prepared by reacting acyloxy-containing siloxanes having the compositions of Formulae 1 and 5 above with any oxyalkylene polymer containing an alkoxy or hydroxy end-blocking group. Such block copolymer products are then useful as foam stabilizers.

What is claimed is:

1. Process for preparing acyloxy-endblocked organosiloxanes having the general formula:

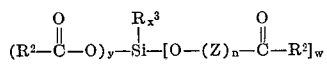

wherein $R^3$ are monovalent organic radicals which are not readily acylated and which are selected from the class consisting of alkyl radicals, cyanoalkyl radicals, alkenyl radicals, alkoxyalkyl radicals and nitroaryl radicals; $R_2$ is selected from the class consisting of hydrogen, alkyl radicals, aryl radicals, alkaryl radicals and aralkyl radicals; $x$ is an integer having a value of 0 to 3 inclusive; $y$ is an integer having a value of 0 to 3 inclusive: $w$ is an integer having a value of 1 to 3 inclusive; the sum of $x+y+w$ is 4; $n$ is an integer having a value greater than 0; Z is a divalent radical consisting of ($RR^1SiO$) units wherein R and $R^1$ are monovalent organic radicals which are not readily acylated as defined above for $R^3$, which comprises reacting in the presence of a metal halide Friedel-Crafts catalyst (1) an acyloxy-containing silicon compound selected from the class consisting of acyloxysilanes having the general formula:

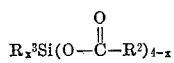

wherein $R^2$, $R^3$ and $x$ are defined above, and acyloxysiloxanes having the general formula:

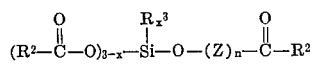

wherein $R^2$, $R^3$, Z, $x$ and $n$ are defined above, with (2) a cyclic diorganosiloxane having the general formula:

wherein R and $R^1$ are defined above and $p$ is an integer having a value from 3 to 4 inclusive.

2. A process for preparing acyloxy-endblocked organosiloxanes as claimed in claim 1 wherein the metal halide Friedel-Crafts catalyst is zinc dichloride.

3. A process for preparing acyloxy-endblocked organosiloxanes as claimed in claim 1 wherein the metal halide Friedel-Crafts catalyst is zinc dichloride and the cyclic diorganosiloxane has the formula [(CH₃)₂SiO]_p wherein $p$ is an integer from 3 to 4 inclusive.

4. A process for preparing acyloxy-endblocked organosiloxanes as claimed in claim 1 wherein the reaction between the starting materials takes place in a polar organic solvent.

5. A process for preparing acyloxy-endblocked organosiloxanes as claimed in claim 1 wherein the reaction takes place in the presence of a catalyst mixture consisting essentially of a metal halide Friedel-Crafts catalyst and a material selected from the class consisting of acyl halides and alkylhalosilanes.

6. A process for preparing acyloxy-endblocked organosiloxanes as claimed in claim 5 wherein the catalyst comprises a mixture of zinc dichloride and acetyl chloride.

7. A process for preparing acyloxy-endblocked organosiloxanes as claimed in claim 5 wherein the catalyst comprises a mixture of zinc dichloride and trimethylchlorosilane.

8. Process for preparing acyloxy-endblocked organosiloxanes having the general formula:

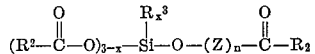

wherein $R^3$ are monovalent organic radicals which are not readily acylated and which are selected from the class consisting of alkyl radicals, cyano-alkyl radicals, alkenyl radicals, alkoxyalkyl radicals and nitroaryl radicals; $R_2$ is selected from the class consisting of hydrogen, alkyl radicals, aryl radicals, alkaryl radicals and aralkyl radicals; $x$ is an integer having a value of 0 to 3 inclusive; $n$ is an integer having a value greater than 0; Z is a divalent radical consisting of ($RR^1SiO$) units wherein R and $R^1$ are monovalent organic radicals which are not readily acylated as defined above for $R^3$, which comprises reacting in the presence of a metal halide Friedel-Crafts catalyst an acyloxysilane having the general formula

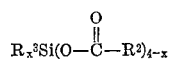

wherein $R^2$, $R^3$ and $x$ are defined above, with a cyclic diorganosiloxane having the general formula ($RR^1SiO$)_p wherein R and $R^1$ are defined above $p$ is an integer having a value from 3 to 4 inclusive.

9. Process for preparing acyloxy-endblocked organosiloxanes having the general formula:

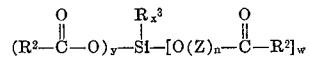

wherein $R^3$ are monovalent organic radicals which are not readily acylated and which are selected from the class consisting of alkyl radicals, cyanoalkyl radicals, alkenyl radicals, alkoxyalkyl radicals and nitroaryl radicals; $R^2$ is selected from the class consisting of hydrogen, alkyl radicals, aryl radicals, alkaryl radicals and aralkyl radicals; $x$ is an integer having a value of 0 to 3 inclusive; $y$ is an integer having a value of 0 to 3 inclusive; $w$ is an integer having a value of 1 to 3 inclusive; the sum of $x+y+w$ is 4; $n$ is an integer having a value greater than 0; Z is a divalent radical consisting of ($RR^1SiO$) units wherein R and $R^1$ are monovalent organic radicals which are not readily acylated as defined above for $R^3$, which comprises reacting in the presence of a metal halide Friedel-Crafts catalyst an acyloxysiloxane having the general formula:

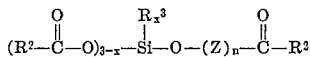

wherein $R^2$, $R^3$, Z, $x$ and $n$ are defined above, with a cyclic diorganosiloxane having the general formula ($RR^1SiO$)_p wherein R and $R^1$ are defined above and $p$ is an integer having a value from 3 to 4 inclusive.

10. A process for preparing acyloxy-endblocked organosiloxanes having the general formula:

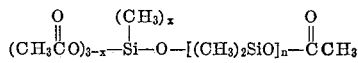

wherein $x$ is an integer having a value of 0 to 3 inclusive; and $n$ is an integer having a value greater than 0, which comprises reacting an acyloxysilane having the general formula:

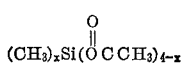

wherein $x$ is defined above with a cyclic diorganosiloxane having the general formula: [(CH₃)₂SiO]_p wherein $p$ is an integer from 3 to 4 inclusive, in the presence of a metal halide Friedel-Crafts catalyst.

11. A process for preparing acyloxy-endblocked organosiloxanes as claimed in claim 10 wherein the metal halide Friedel-Crafts catalyst is zinc dichloride.

12. A process for preparing acyloxy-endblocked organosiloxanes as claimed in claim 10 wherein the reaction between the starting materials takes place in a polar organic solvent.

13. A process for preparing an acyloxy-endblocked organosiloxane having the formula:

$$(CH_3)_3SiO[(CH_3)_2SiO]_3OCCH_3$$

which comprises reacting trimethylacetoxysilane with dimethylsiloxane cyclic trimer in the presence of zinc dichloride catalyst.

14. A process for preparing an acyloxy-endblocked organosiloxane having the formula:

$$(CH_3COO)[(CH_3)_2SiO]_4OCCH_3$$

which comprises reacting dimethyldiacetoxysilane with dimethylsiloxane cyclic trimer in the presence of zinc dichloride catalyst.

15. A process for preparing an acyloxy-endblocked organosiloxane having the formula:

$$(CH_3COO)_2Si(CH_3)O[(CH_3)_2SiO]_3OCCH_3$$

which comprises reacting methyltriacetoxysilane with dimethylsiloxane cyclic trimer in the presence of zinc dichloride catalyst.

16. A process for preparing an acyloxy-endblocked organosiloxane having the formula:

$$(CH_3)_3SiO[(CH_3)_2SiO]_4OCCH_3$$

which comprises reacting trimethylacetoxysilane with dimethylsiloxane cyclic tetramer in the presence of zinc dichloride catalyst.

17. A process for preparing an acyloxy-endblocked organosiloxane having the formula:

$$(CH_3)_3SiO[(CH_3)_2SiO]_3OCCH_2CH_3$$

which comprises reacting trimethylpropionoxysilane with dimethylsiloxane cyclic trimer in the presence of zinc dichloride catalyst.

18. A process for preparing an acyloxy-endblocked organosiloxane having the formula:

$$(CH_3)_3SiO[(C_2H_5)_2SiO]_3OCCH_3$$

which comprises reacting trimethylacetoxysilane with diethylsiloxane cyclic trimer in the presence of zinc dichloride catalyst.

19. A process for preparing an acyloxy-endblocked organosiloxane having the formula:

$$(CH_2=CH)(CH_3)_2SiO[(CH_3)_2SiO]_3OCCH_3$$

which comprises reacting vinyldimethylacetoxysilane with dimethylsiloxane cyclic trimer in the presence of zinc dichloride catalyst.

20. A process for preparing acyloxy-containing siloxane having the formulae:

$$CH_3COOSi(CH_3)(O[(CH_3)_2SiO]_3OCCH_3)_2$$

and $$CH_3Si(O[(CH_3)_2SiO]_3OCCH_3)_3$$

which comprises reacting 1,1,7-triacetoxyheptamethyltetrasiloxane with dimethylsiloxane cyclic trimer in the presence of zinc chloride catalyst.

21. A composition of matter of an acyloxy-containing siloxane having the formula:

$$(R^2-\underset{\underset{O}{\|}}{C}-O)_s-\underset{\underset{R^3}{|}}{Si}-(O-[R_2SiO]_3-\underset{\underset{O}{\|}}{C}-R^2)_t$$

wherein R, $R^2$, $R^3$ are defined above in claim 1, $s$ is an integer having a value of 0 to 1 inclusive, $t$ is an integer having a value of 2 to 3 inclusive, and the sum of $s$ and $t$ is 3.

22. A composition of matter of an acyloxy-containing siloxane having the formula:

$$(R^2-\underset{\underset{O}{\|}}{C}-O)-\underset{\underset{R^3}{|}}{Si}-(O-[R_2SiO]_3-\underset{\underset{O}{\|}}{C}-R^3)_2$$

wherein R, $R^2$ and $R^3$ are defined above in claim 1.

23. A composition of matter of an acyloxy-containing siloxane having the formula:

$$R^3Si-(O[R_2SiO]_3-\underset{\underset{O}{\|}}{C}-R^2)_3$$

wherein R, $R^2$ and $R^3$ are defined above in claim 1.

24. A composition of matter of an acyloxy-containing siloxane having the formula:

$$(CH_3COO)-Si(CH_3)-(O-[(CH_3)_2SiO]_3OCCH_3)_2$$

25. A composition of matter of an acyloxy-containing siloxane having the formula:

$$CH_3Si-(O-[(CH_3)_2SiO]_3OCCH_3)_3$$

References Cited

UNITED STATES PATENTS

| | | | |
|---|---|---|---|
| 3,032,532 | 5/1962 | Bruner | 260—448.8 |
| 3,035,016 | 5/1962 | Bruner | 260—448.8 |
| 3,240,731 | 3/1966 | Nitzsche et al. | 260—448.8 |

OTHER REFERENCES

Valade, "Comptes Rendus," vol. 246, 1958, pp. 952–4.

TOBIAS E. LEVOW, *Primary Examiner.*

SAMUEL H. BLECH, *Examiner.*

P. F. SHAVER, *Assistant Examiner.*